United States Patent [19]

Sasaki et al.

[11] Patent Number: 5,481,298
[45] Date of Patent: Jan. 2, 1996

[54] APPARATUS FOR MEASURING DIMENSIONS OF OBJECTS

[75] Inventors: Masahiko Sasaki; Masaaki Kaneko, both of Tamano, Japan

[73] Assignees: Mitsui Engineering & Shipbuilding Co. Ltd.; Toyama Light Metal Industry Co., Ltd., both of Tokyo, Japan

[21] Appl. No.: 403,950

[22] Filed: Mar. 14, 1995

Related U.S. Application Data

[63] Continuation of Ser. No. 115,801, Sep. 3, 1993, abandoned, which is a continuation of Ser. No. 839,556, Feb. 24, 1992, abandoned.

[30] Foreign Application Priority Data

Feb. 25, 1991 [JP] Japan .................... 3-030231

[51] Int. Cl.⁶ .................................... H04N 7/18
[52] U.S. Cl. .................................... 348/135; 348/86
[58] Field of Search ................... 348/86, 87, 61, 348/135, 142; 356/237

[56] References Cited

U.S. PATENT DOCUMENTS

| | | | |
|---|---|---|---|
| 4,310,850 | 6/1982 | Casler, Jr. | 358/107 |
| 4,867,569 | 9/1989 | Mohara | 358/101 |
| 4,893,183 | 1/1990 | Nayar | 358/101 |
| 4,970,653 | 11/1990 | Kenue . | |
| 5,091,692 | 2/1992 | Ohno et al. | 358/107 |
| 5,126,569 | 6/1992 | Carlson | 358/107 |
| 5,136,948 | 8/1992 | Fujino | 358/107 |

FOREIGN PATENT DOCUMENTS

| | | |
|---|---|---|
| 10330901 | 2/1989 | European Pat. Off. . |
| 60-194302 | 10/1985 | Japan . |
| 62-52404 | 3/1987 | Japan . |
| 63-134940 | 6/1988 | Japan . |
| 1213504 | 8/1989 | Japan . |
| 2213930 | 8/1989 | United Kingdom ............ 358/107 |

*Primary Examiner*—Curtis Kuntz
*Assistant Examiner*—Minsun Oh
*Attorney, Agent, or Firm*—Nikaido, Marmelstein, Murray & Oram

[57] ABSTRACT

An object dimension measuring apparatus consists of: a CCD camera mounted on an X- and a Y-axis table with its optical axis aligned with a Z-axis; a specimen table containing a light source and having its specimen mounting surface formed transparent; a light diffusion plate mounted on the specimen; and a computer. Using the CAD data, the computer moves the CCD camera. From the measured values obtained from the photographed images of the end portions of the specimen and from the distance traveled by the CCD camera, the computer calculates the dimensions of the specimen.

2 Claims, 4 Drawing Sheets

$\rho = x_i \cos\theta + y_i \sin\theta$ $(\rho_0, \theta_0)$

APPARATUS FOR MEASURING DIMENSIONS OF OBJECTS

This application is a continuation of application Ser. No. 08/115,801, filed on Sep. 3, 1993, now abandoned, which is a continuation application of Ser. No. 07/839,556 filed Feb. 24, 1992, now abandoned.

FIELD OF THE INVENTION

This invention relates to an apparatus for measuring the dimensions of objects and more specifically to a high-precision object dimension measuring apparatus using CCD camera and CAD data.

BACKGROUND OF THE INVENTION

Long objects with certain cross-sectional shapes, such as square pipes and L-shaped materials of aluminum or aluminum alloy, are generally formed by extrusion. The quality of the extruded products depends on the quality of a die and particularly on the dimensions of an opening or gap in the die.

The dimensions of the opening in the die have conventionally been measured indirectly by measuring the cross-sectional dimensions of an extruded products.

However, indirect measurement of the dimensions of the die opening is not efficient and thus there is a demand for directly measuring the dimensions of the die opening.

Regardless whether the measurement is made directly of the die opening or alternatively of the extruded product, it is difficult to attain a high precision within a tolerance on the order of one-hundredth of a millimeter where the maximum cross-sectional dimension of the die opening or the extruded product exceeds about 600 mm.

Another known means of measuring the dimensions of an object is a CCD camera. If, for example, an image of an object 10 mm long is taken by a CCD camera and processed at the resolution of 256 picture elements or pixels, then the measuring precision of 10/256=0.039 mm per pixel is possible. When the same image is processed with 512 pixels, the accuracy improves to 0.019 mm per pixel. In this way, the use of the CCD camera and appropriate lens system assures high precision with which the dimensions of small objects can be measured. This, however, gives rise to a problem that if this high level of accuracy is maintained, objects longer than 10 mm cannot be measured accurately. For example, in measuring the dimensions of the cross section of a square pipe 300 mm on each side, if the entire image of the object being measured is displayed on one field of view of camera, the above level of measuring precision cannot be obtained.

SUMMARY OF THE INVENTION

The object of this invention is to provide an object dimension measuring apparatus which can measure with an accuracy of $^1/_{100}$ mm the dimensions of an object too large to be taken in a single field of view of the CCD camera.

The object dimension measuring apparatus that achieves the above objective consists of: a CCD camera mounted to an X- and a Y-axis table with its optical axis aligned with a Z-axis; a specimen table incorporating a light source and having its specimen mounting surface formed of a transparent member; a light diffusion plate mounted on the specimen; and a computer. The computer further comprising: a control device for moving a field of view of the CCD camera by using CAD data; a coordinate detecting device for detecting coordinates of the CCD camera's field of view on the X- and Y-axis table; an image processing device for processing output signals from the CCD camera; an intensity reversing point detecting device for detecting intensity reversing points on the image produced by the image processing device; a coordinate calculation device for calculating the coordinates of the intensity reversing points on the image; and a calculation device for calculating the dimensions of the specimen from a distance traveled by the CCD camera and x, y coordinates of the image.

This configuration makes it possible to measure with an accuracy of $^1/_{100}$ mm the dimensions of an object too large to be taken in a single field of view of the CCD camera.

Since an optical measurement is made, this configuration allows highly precise and efficient measurement of the dimensions of the interior of an object that can be seen from outside. Furthermore, since CAD data is used, the measurement can be done automatically.

DESCRIPTION OF THE PREFERRED EMBODIMENT

One embodiment of the invention will be described by referring to the attached drawings.

Figure 1:
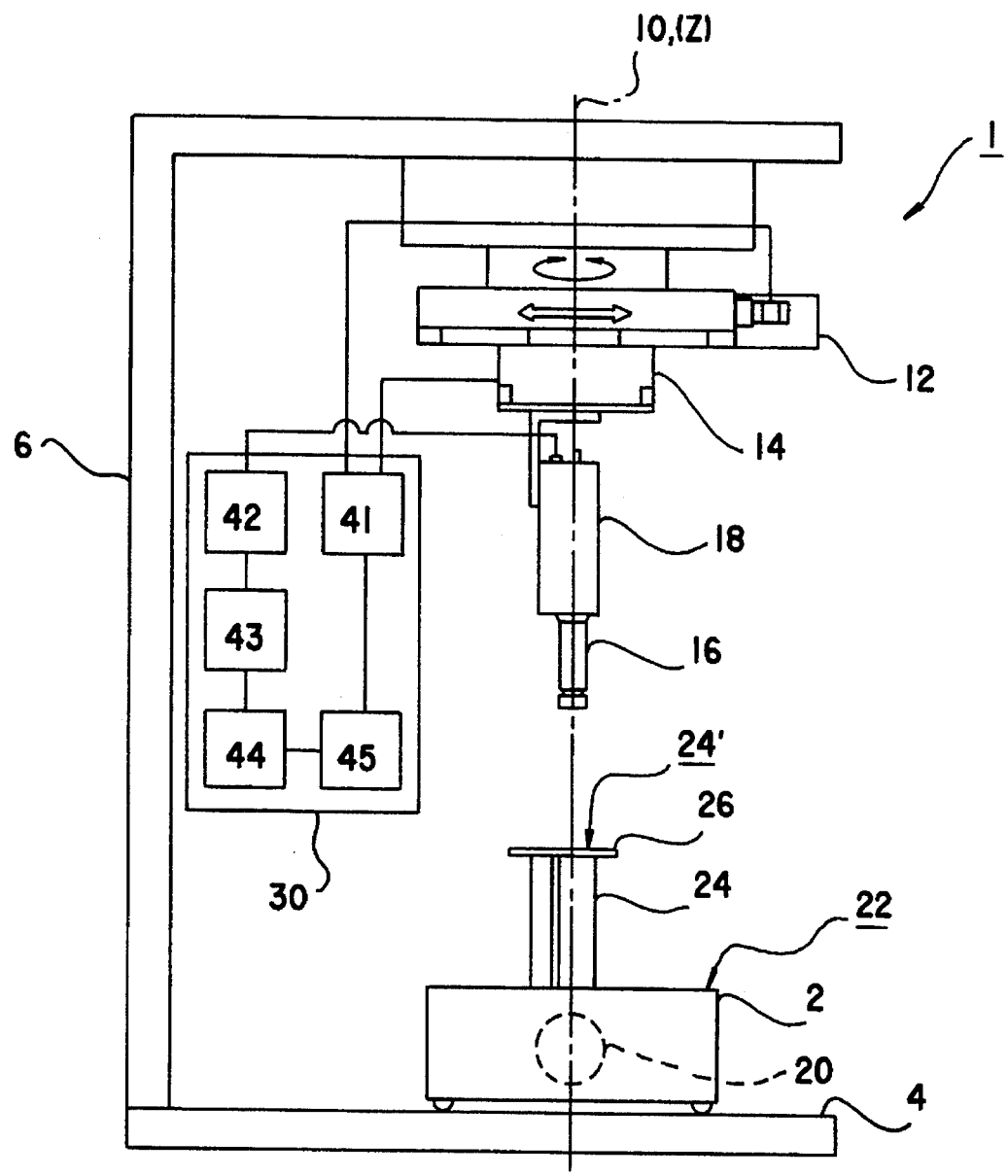
FIG. 1 is a side view of the object dimension measuring apparatus according to this invention.

Referring to FIG. 1, reference numeral 1 represents a dimension measuring apparatus, which has an L-shaped frame 6 erected on a base 4 on which a specimen table 2 is mounted. Under the upper portion of the frame 6 are arranged an X-axis table 12 and a Y-axis table 14. On the Y-axis table 14 is mounted a CCD camera 18 that has a lens 16 whose optical axis 10 is aligned with a Z-axis.

The specimen table 2 has a light source 20 installed therein and also a transparent plate 22 at the top, on which a specimen 24 is supported by a clamp not shown. A light diffusion plate 26 of semi-transparent material is placed on the specimen 24. The specimen 24 is a sample taken from aluminum extrusion products. When the light source 20 is turned on, a shadow 24' of the cross section of the specimen 24 is projected onto the light diffusion plate 26.

Denoted 30 is a computer, which consists of: a control means 41 using CAD data for moving the field of view of the CCD camera; a coordinate detection means 41 for detecting the coordinates of the CCD camera's field of view on the X- and Y-axis table; an image processing means 42 for processing output signals from the CCD camera; a intensity reversing point detecting means 43 for detecting intensity reversing points on the image produced by the image processing means 42; a coordinate calculation means 44 for calculating the coordinates of the intensity reversing points on the image; and a calculation means 45 for determining the dimensions of the specimen from the distance traveled by the CCD camera and from the x and y coordinates of the image.

Next, the process of measuring the width L of the shadow 24' of the specimen will be explained. If the pixel data from the CCD camera 18 in this embodiment is processed at the 480×512-pixel resolution, the accuracy of the measurement will be 5/480=0.0104 mm and 5/512=0.0098 mm per pixel. Numeral 41 represents a control means for shifting the view-field of CCD camera 18, and a detecting means for detecting the coordinate position of the view field of the CCD camera on an X–Y axis table. Numeral 42 is an image processing means for processing the output signal from CCD camera 18 to an image. Numeral 43 denotes detecting means for detecting intensity reversing points in the images obtained through the image processing means 42. Coordinate calculating means 44 is provided for calculating the coordinates of the intensity reversing points on the image, and calculating means 45 is provided for calculating the dimensions of a specimen based on the distance of movement of CCD camera 18 and the X–Y coordinates of the image.

Figure 2:
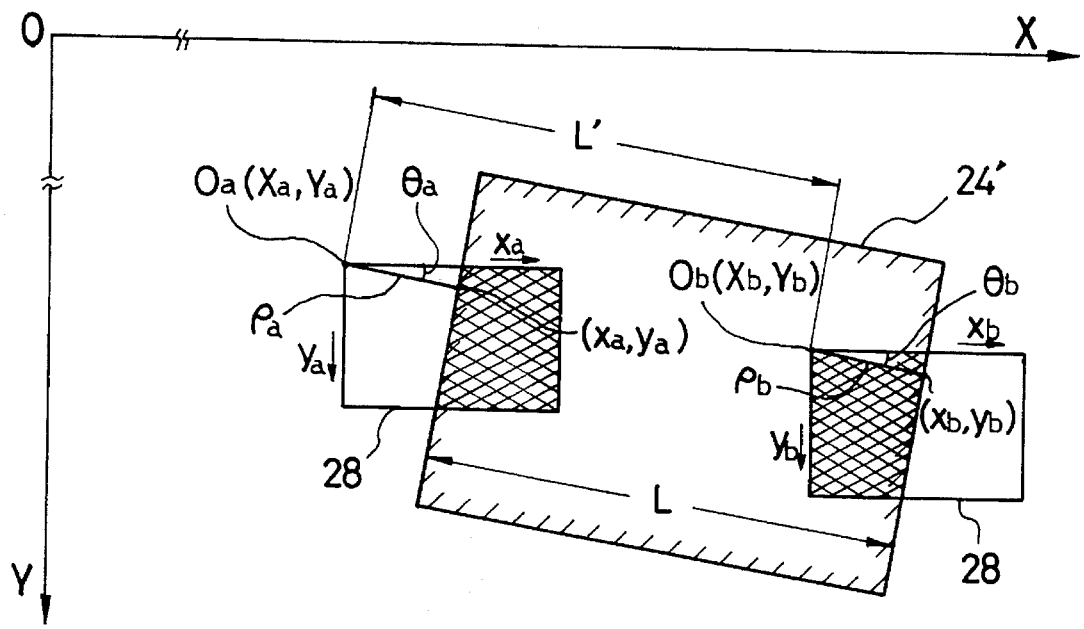
FIG. 2 is a diagram showing the process of making measurement of the dimensions of an object by the object dimension measuring apparatus of the invention.

As shown in FIG. 2, the field of view 28 of the CCD camera 18 is moved, according to the CAD data, until the upper left corner of the viewing field comes to a point $O_a$ ($X_a$, $Y_a$) on the X- and Y-axis table 12, 14. Then the left side portion of the shadow 24' of the specimen is photographed. The photographed image is bright in the left part. Similarly, the upper left corner of the field of view 28 of the CCD camera 18 is moved to a point $O_b$ ($X_b$, $Y_b$) on the X- and Y-axis table 12, 14 to take a picture of the right side portion of the specimen's shadow 24'. The photographed image is dark in the left part.

A means for detecting the distance traveled by the origins $O_a$, $O_b$ may employ various kinds of methods, such as one for converting the rotation of a ball screw into a distance signal by a rotary encoder, one for magnetically detecting the movement of a magnetic scale and converting it into pulse signals, or one for moving the X- and Y-axis table at a constant speed and reading the time traveled with a timer. This embodiment adopts the method of converting the rotation of the ball screw of X–Y table into the distance signal by the rotary encoder. That is, the coordinates of the origin $O_a$ ($X_a$, $Y_a$) and the origin $O_b$ ($X_b$, $Y_b$) are read and the coordinate detection circuit in the computer 30 calculates the distance traveled by the CCD camera 18, i.e., the distance L' between the origins $O_a$, $O_b$.

The intensity level detection circuit sorts the intensity output from each image-processed pixel into one of 256 levels (0–255) and produces a binary output—a "0" (representing a dark point) when the intensity falls in the 0–99 range and a "1" when it falls in the 100–255 range—to identify the intensity of each image. This circuit also scans each pixel to output their coordinate signals of ($x_a$, $y_a$) and ($x_b$, $y_b$) along with the binary signals. (In the following, suffix is omitted when general explanations are given.)

The intensity reversing point detecting circuit, which employs, for example, the Hough transform technique, samples a plurality of x, y coordinate data for the intensity reversing points (in this embodiment 17 samples) and calculates the distance ρ of each sampled value from the origin O and its angle θ with respect to the x-axis according to a predetermined sequence. The principle of this process is explained by referring to FIG. 3. The y-axis in FIG. 3 is shown inverted with respect to the x-axis to present the ordinary x, y coordinates for better understanding.

Figure 3:
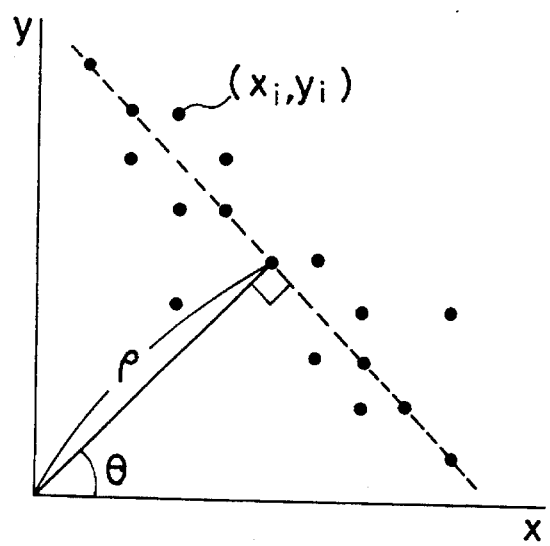
FIG. 3 is a diagram showing the relationship between sample data and $\rho$ and $\theta$.

It is easily seen from FIG. 2 and FIG. 3 that the relationship between ρ and θ is expressed as $$\rho = x \cos\theta + y \sin\theta \quad (1)$$

Figure 4:
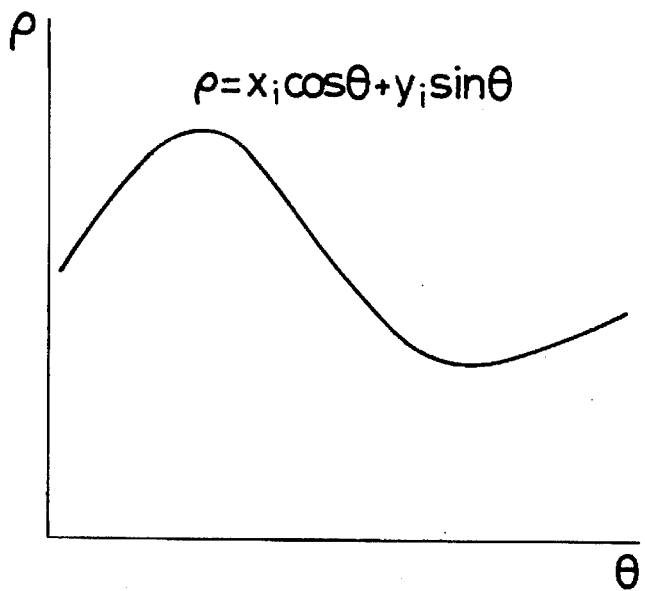
FIG. 4 is a diagram describing one sample data in the $\rho$-$\theta$ space.
Figure 5:
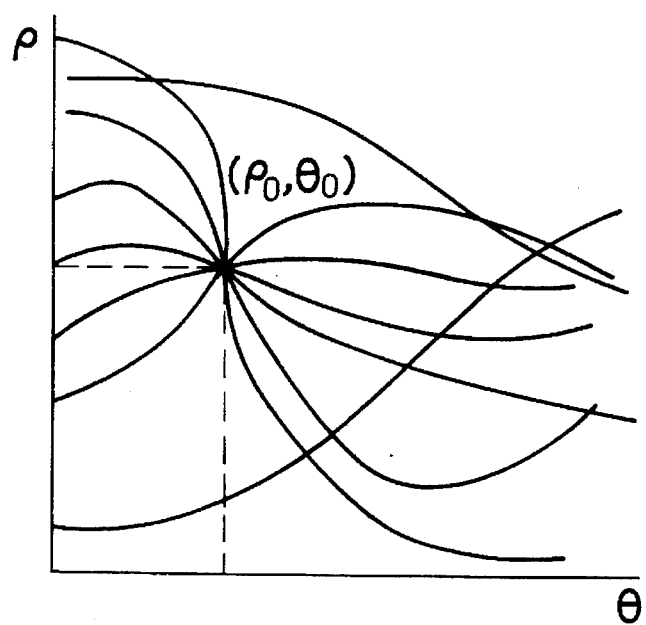
FIG. 5 is a diagram describing all sample data in the $\rho$-$\theta$ space.
Figure 6:
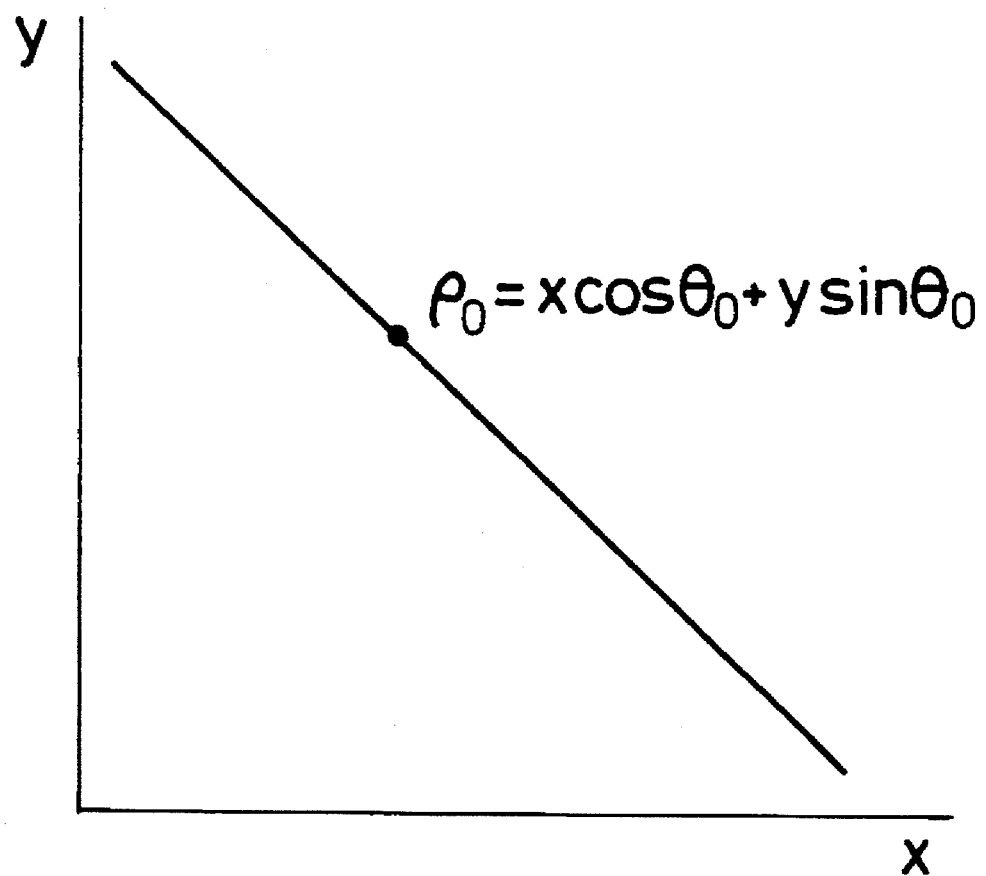
FIG. 6 is a diagram describing in the x–y coordinates a straight line estimated from the graph of FIG. 5.

The plotted points in FIG. 3 represent the sample data of the intensity reversing points (or edge) on the specimen shadow 24' and the broken line represents an edge line estimated from these data by the Hough transform technique. All the straight lines passing through the points ($x_i$, $y_i$) (i=1–17) plotted in FIG. 3 each form a curve as shown in FIG. 4, when mapped in the θ-ρ space. When the locus is described for all candidate points (intensity reversing point data), FIG. 5 is obtained Then calculating the point ($\theta_o$, $\rho_o$) through which the greatest number of loci pass results in one straight line being determined, which is shown in FIG. 6 and given by $$\rho_o = x \cos\theta_o + y \sin\theta_o \quad (2)$$

Using this equation, it is possible to determine $\rho_a$, $\rho_b$ for the first coordinates ($X_a$, $Y_a$) and the second coordinates ($X_b$, $Y_b$). That is, $$\rho_a = x_a \cos\theta_a + y_a \sin\theta_a \quad (3)$$

$$\rho_b = x_b \cos\theta_b + y_b \sin\theta_b \quad (4)$$

Since the specimen 24 is rectangular in shape, $\theta_a = \theta_b$. If we let L (see FIG. 2) stand for the distance the two straight lines (edges) and L' for the distance between the origins $O_a$ and $O_b$, the width L of the specimen 24 can be obtained from the following equation (5).

$$L = L' + \rho_b - \rho_a \quad (5)$$

While the above description concerns the case of determining the distance between the parallel sides of the rectangular cross section of the specimen, it is possible to measure the dimensions of objects of complex shape by defining and programming an adequate calculation equation according to the shape of the specimen being measured. The minimum square method may also be used.

What is claimed is:

1. An object dimension measuring apparatus for measuring dimensions of objects which are too large to be taken in a single field of view comprising:

a CCD camera moveably mounted to an X- and a Y-axis table so that the optical axis of the CCD camera is aligned with a Z-axis;

a specimen table incorporating a light source and having a specimen mounting surface formed of a transparent member;

a light-diffusion plate of semi-transparent material mounted on a specimen; and a computer, the computer including a control means for moving a field of view of the CCD camera by using a CAD data, a coordinate detecting means for detecting coordinates of the CCD camera's field of view on the X- and Y-axis table, an image processing means for processing output signals from the CCD camera, an intensity reversing point detecting means for detecting intensity reversing points on an image produced by the image processing means, a coordinate calculation means for calculating the coordinates of the intensity reversing points on the image, and a calculation means for calculating the dimensions of the specimen from a distance traveled by the CCD camera and x, y coordinates of the image.

2. A method of measuring dimensions of objects which are too large to be taken in a single field of view comprising the steps of:

moving a CCD camera's field of view until an upper left corner of a viewing field is at a first predetermined point;

photographing a left side portion of a shadow of a specimen;

moving said CCD camera's field of view until a right corner of said viewing field is at a second predetermined point;

photographing a right side portion of said shadow of said specimen;

detecting a distance travelled by the CCD camera between said first and second predetermined points;

sorting an intensity output from each pixel of said CCD camera into a plurality of levels to identify an intensity of each pixel image;

determining a location of each pixel image;

sampling a plurality of pixel images to determine intensity reversing points;

calculating a distance of each sampled pixel image from an origin and calculating an angle with respect to an X-axis;

estimating an edge of said specimen based on said intensity reversing points, distance and angle from said origin; and determining a width of said specimen based upon said edge.

* * * * *